(12) United States Patent
Hiraiwa et al.

(10) Patent No.: US 7,692,544 B2
(45) Date of Patent: Apr. 6, 2010

(54) SYSTEM CONFIGURATION MANAGEMENT APPARATUS

(75) Inventors: Kenzo Hiraiwa, Kawasaki (JP); Manabu Okubo, Kawasaki (JP); Sachio Onoshita, Kawasaki (JP); Yoshinori Kunii, Kawasaki (JP); Ken Sano, Setagaya (JP); Makiko Kimura, Kawasaki (JP); Tomohisa Misawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/746,287

(22) Filed: May 9, 2007

(65) Prior Publication Data
US 2007/0262877 A1 Nov. 15, 2007

Related U.S. Application Data

(63) Continuation of application No. PCT/JP2004/016888, filed on Nov. 12, 2004.

(51) Int. Cl.
*G08B 13/14* (2006.01)
(52) U.S. Cl. ............... 340/572.1; 340/679; 235/375
(58) Field of Classification Search ... 340/572.1–572.8, 340/679; 235/375–385
See application file for complete search history.

(56) References Cited

U.S. PATENT DOCUMENTS

| | | | | |
|---|---|---|---|---|
| 5,469,363 A * | 11/1995 | Saliga | ............ | 235/380 |
| 5,594,439 A * | 1/1997 | Swanson | ............ | 341/118 |
| 6,176,425 B1 * | 1/2001 | Harrison et al. | ............ | 235/385 |
| 6,232,877 B1 * | 5/2001 | Ashwin | ............ | 340/572.1 |
| 6,321,983 B1 * | 11/2001 | Katayanagi et al. | ............ | 235/380 |
| 6,385,407 B1 * | 5/2002 | Inose | ............ | 340/539.1 |
| 6,422,474 B1 * | 7/2002 | Gossweiler et al. | ............ | 235/492 |
| 6,550,674 B1 * | 4/2003 | Neumark | ............ | 235/383 |
| 6,608,561 B2 * | 8/2003 | Lawler et al. | ............ | 340/572.8 |
| 6,769,604 B2 * | 8/2004 | Ichikawa et al. | ............ | 235/375 |
| 7,042,346 B2 * | 5/2006 | Paulsen | ............ | 340/438 |
| 2003/0220851 A1 | 11/2003 | Ichikawa et al. | | |

FOREIGN PATENT DOCUMENTS

| | | |
|---|---|---|
| JP | 2-245838 | 10/1990 |
| JP | 07-219806 | 8/1995 |
| JP | 10-222568 | 8/1998 |
| JP | 11-259339 | 9/1999 |
| JP | 2001-195114 | 7/2001 |
| JP | 2001-306360 | 11/2001 |
| JP | 2003-233652 | 8/2003 |
| JP | 2004-46773 | 2/2004 |

OTHER PUBLICATIONS

International Search Report of the International Published Application No. PCT/JP2004/016888 (mailed Feb. 22, 2005).
Japanese Office Action mailed Nov. 10, 2009 and issued in corresponding Japanese Patent Application 2006-544711.

* cited by examiner

*Primary Examiner*—Eric M Blount
(74) *Attorney, Agent, or Firm*—Staas & Halsey LLP

(57) ABSTRACT

In configuration management for a system constituted by a plurality of components, each of which has a radio frequency identification tag attached, the operating condition of each component is checked and component information of each component recorded in the radio frequency identification tag is read out by a tag reader at a predetermined opportune time. Then, the check result of the operating condition and the readout component information are recorded for each component.

11 Claims, 10 Drawing Sheets

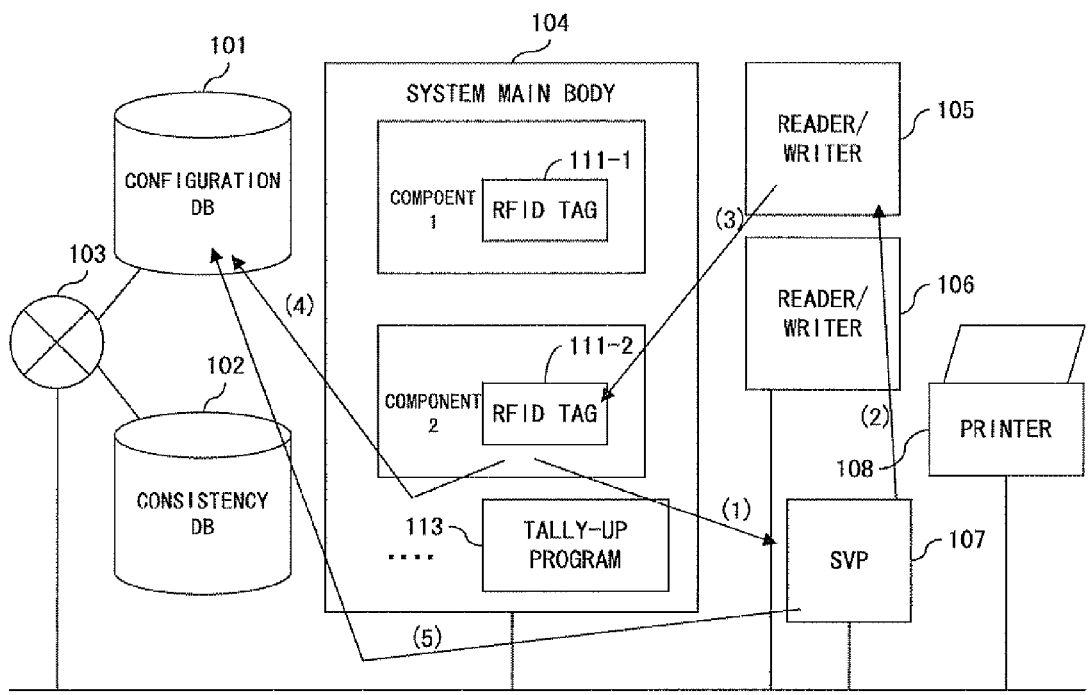
F I G. 3

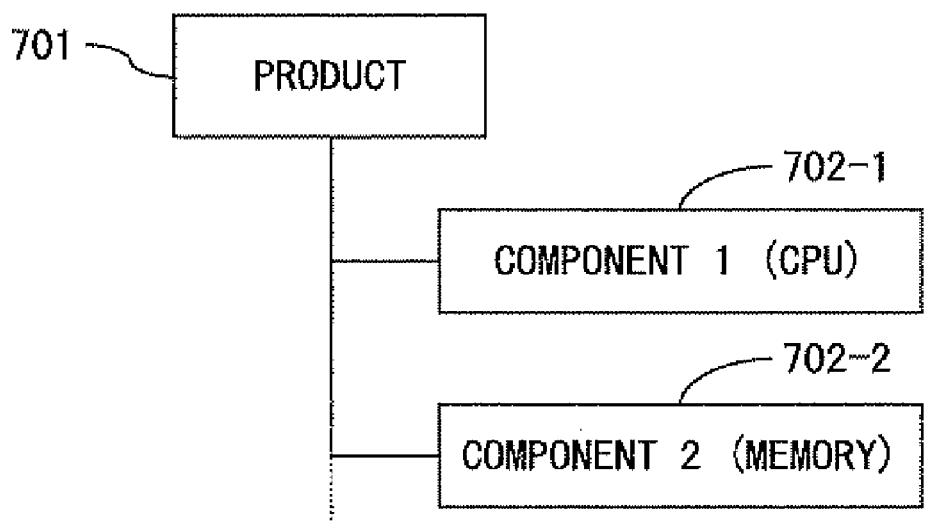
F I G. 7

SYSTEM CONFIGURATION MANAGEMENT APPARATUS

CROSS REFERENCE TO RELATED APPLICATION

This application is a continuation application of International PCT Application No. PCT/JP2004/016888 which was filed on Nov. 12, 2004.

BACKGROUND OF THE INVENTION

1. Field of the Invention

The present invention relates to an apparatus for managing a system configuration by using a radio frequency identification tag attached to a constituent component of an information processing system or the like.

2. Description of the Related Art

Recent years have witnessed systematic approaches to improving support operations for information processing systems, but many parts of the support operations still require manually operated maintenance services when an abnormality occurs, which results in the following problems:

(1) A field engineer (FE) who maintains software and hardware at a customer site is required to confirm information of hardware components constituting a system one piece at a time and to then integrate it.

(2) Consistency between components, or between a component and a system, cannot be checked.

(3) The number of error occurrences for a component cannot be recorded. That is, the history of an error cannot be grasped.

(4) A component code for identifying a component on some replacement component cannot be verified when ordering the replacement component, possibly resulting in the obtainment of a different component.

(5) A physical failure point is first identified by an alarm or the like when an FE arrives at a customer's site and turns on the power of a system.

A prior patent application to the present invention, Japanese patent application No. 2004-170744, has disclosed, as a countermeasure, a method of attaching to each component a radio frequency identification (RFID) tag that includes version information of each component equipped in a server chassis, and that collects the information when the chassis is opened, thereby obtaining information of each of the components all at once.

A server system, however, includes a vast number of components and some components may be replaced at the discretion of a user. Therefore, it is difficult for an FE to discern the location of a failure in a system in which a failure has occurred.

Patent document 1 relates to a quality control method in which a product is shipped with an attached information recording medium such as a barcode label or the like that records the contents of the product, and patent document 2 relates to a management method that carries out an implementation check of hardware by comparing specific information such as a version number written in a storage unit of the hardware with specific information stored in a management apparatus.

Patent document 1: Japanese Patent Application Publication No. 2003-233652

Patent document 2: Japanese Patent Application Publication No. H07-219806

SUMMARY OF THE INVENTION

An object of the present invention is to manage a system configuration by using an RFID tag attached to a constituent component of a system and to improve the efficiency of maintenance services at the occurrence of an abnormality.

A management apparatus according to the present invention, comprising a check unit, a tag reader, and a storage unit, manages a configuration of a system constituted by a plurality of components, each of which has a radio frequency identification tag attached. The check unit checks the operating condition of each component at a predetermined opportune time. The tag reader reads component information of each component recorded in a radio frequency identification tag at the predetermined opportune time. The storage unit stores the check result of the operating condition and component information for each component.

Such a configured management apparatus enables the automatic obtainment of information of the currently used component by the check unit and tag reader at a predetermined opportune time and a recording of the information in the storage unit without the need for an FE to visit a customer's site. This accordingly enables the accurate comprehension of the condition of constituent components at all times even if a system is constituted by a large number of components and/or if a component is replaced at a customer's discretion. Therefore, it is possible to identify locations of failures immediately when an abnormality occurs.

The management apparatus stores operation abnormality information as a result of checking the operating condition if, for example, the operation of a component cannot be verified. It also compares immediately previous component information stored in the storage unit with the current component information read out of the radio frequency identification tag and stores component abnormality information if these pieces of information are not identical.

For example, the check unit corresponds to a service processor 107 or service processor 604 (both of which are described later), and the tag reader corresponds to a reader/writer 106 or reader/writer 602 (both of which are described later). Also, for example, the storage unit corresponds to a configuration database 101, RFID condition database 601, or component condition database 605 (all of which are described later).

For example, the component information corresponds to information such as the serial number within a component record described later. For example, the operation abnormality information corresponds to information such as problem occurrence date, the phenomenon of the problem, a component exchange management item within a component record on the configuration database 101, or a condition flag (false) of the current information B2 within a component record of the component condition database 605. Further, the component abnormality information corresponds to a condition flag (false) of the current information A2 within a component record of the RFID condition database 601.

BRIEF DESCRIPTION OF THE DRAWINGS

FIG. 3 is a diagram showing an error occurrence recording process according to the present invention;

FIG. 7 is a diagram showing a record of a database;

DESCRIPTION OF THE PREFERRED EMBODIMENTS

The following is a detailed description of the preferred embodiment of the present invention, referring to the accompanying drawings.

The present embodiment is configured to attach a rewritable RFID tag to each component when the component is shipped from a factory and to carry out system support of a hardware system by using the RFID tag.

Figure 1:
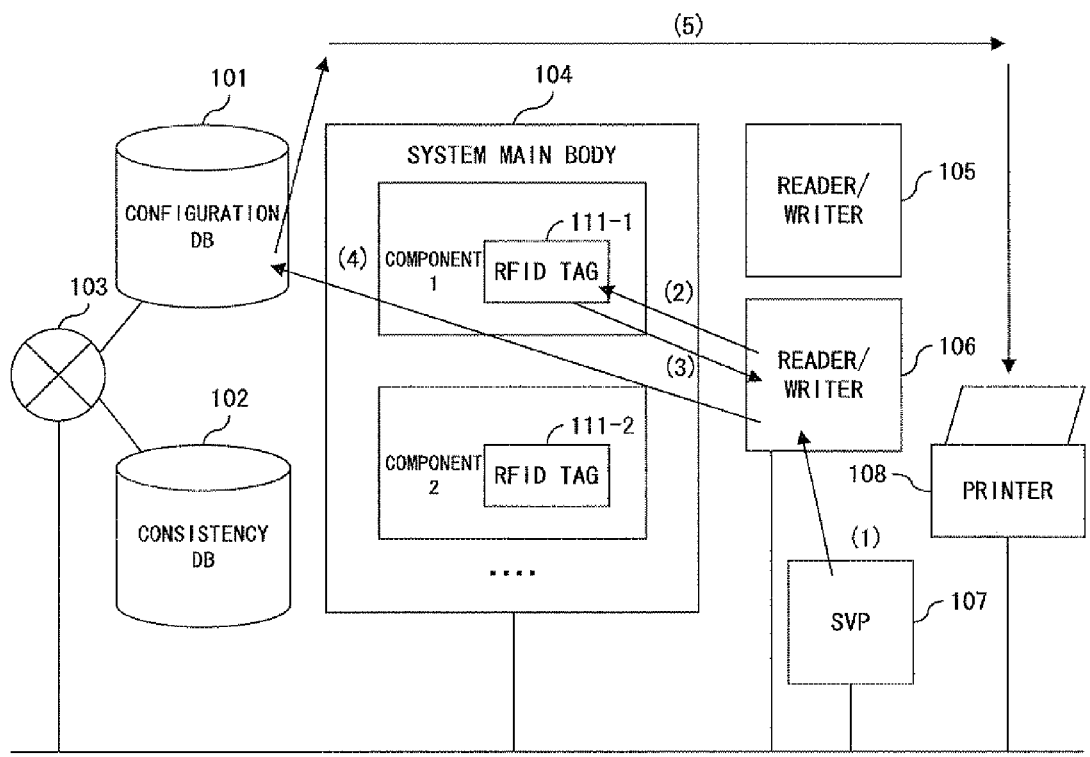
FIG. 1 is a diagram showing a configuration management process according to the present invention.

FIG. 1 shows, as a target of management, an example of a configuration management process based on such a system support model, exemplifying a system main body (i.e., a product) 104 and comprising n pieces of components, i.e., component 1, component 2 . . . through component n, with each of the components (where i=1, 2 . . . through n) having an RFID tag 111-*i* attached.

In addition to the system main body 104, the following are also equipped: a configuration database (DB) 101, a consistency database (DB) 102, reader/writers 105 and 106, a service processor (SVP) 107, and a printer 108. Among the above, the configuration DB 101 and consistency DB 102 are connected to the SVP 107 and such by way of a communications network 103. The reader/writers 105 and 106 are capable of reading information from and writing information to an RFID tag 111-*i* in a noncontact configuration by means of a radio communication technique.

The configuration management process carries out configuration management automatically for each component and as a system by attaching an RFID tag 111-*i* to the component i. The initial value of a record within an RFID tag 111-*i* is recorded at the time of shipment from a factory, and the value is updated in the field. The procedure of the configuration management process is as follows:

(1) The SVP 107 instructs the reader/writer 106 to collect configuration information.

(2) The reader/writer 106 refers to information of each RFID tag 111-*i*.

(3) Each RFID tag 111-*i* provides the reader/writer 106 with the information.

(4) The SVP 107 generates configuration information of the system main body 104 based on the information from the RFID tag 111-*i* and stores the information in the configuration DB 101.

(5) The SVP 107 instructs the printer 108 to print the configuration information stored in the configuration DB 101.

A record within the RFID tag 111-*i* and that of configuration information within the configuration DB 101 can be designed as follows, for example. A product record is a record of the system main body 104, and a component record is that of each component i. "Location" is the location at which writing occurs, and "Occasion" is the time at which writing occurs.

I. Record Design of an RFID Tag

1. Product Record

|  | Location | Occasion |
|---|---|---|
| (1) Product record | Factory | At shipping |
| (2) Serial number | Factory | At shipping |
| (3) EC number |  |  |
|    Initial value | Factory | At shipping |
|    Update | Field | At application of EC |
| (4) Shipping date | Factory | At shipping |
| (5) Factory Shipped From | Factory | At shipping |
| (6) Return destination | Factory | At shipping |
| (7) Return address | Factory | At shipping |
| (8) Customs clearance date | Field | At delivery |
| (9) Shipping destination | Factory | At shipping |

2. Component Record

|  | Location | Occasion |
|---|---|---|
| (1) Component code | Factory | At shipping |
| (2) Serial number | Factory | At shipping |
| (3) EC number |  |  |
|    Initial value | Factory | At shipping |
|    Update | Field | At application of EC |
| (4) EC application date | Field | At application of EC |
| (5) Used-product code |  |  |
|    Initial value | Factory | At shipping |
|    Update | Field | At replacement |
| (6) Used-product serial number |  |  |
|    Initial value | Factory | At shipping |
|    Update | Field | At replacement |
| (7) Shipping date | Factory | At shipping |
| (8) Warranty date | Factory | At shipping |
| (9) Factory Shipped From | Factory | At shipping |
| (10) Return address | Factory | At shipping |
| (11) Customs clearance date | Field | At reception |
| (12) Shipping destination | Factory | At shipping |
| (13) Problem occurrence date 1 | Field | At occurrence |
| (14) Phenomenon 1 | Field | At occurrence |
| (15) Countermeasure 1 | Field | At occurrence |
| (16) Problem occurrence date 2 | Field | At occurrence |
| (17) Phenomenon 2 | Field | At occurrence |
| (18) Countermeasure 2 | Field | At occurrence |
| (19) Problem occurrence date 3 | Field | At occurrence |
| (20) Phenomenon 3 | Field | At occurrence |
| (21) Countermeasure 3 | Field | At occurrence |

II. Record Design of Configuration DB

1. Product Record

|  | Location | Occasion |
|---|---|---|
| (1) Product code | Factory | At shipping |
| (2) Serial number | Factory | At shipping |
| (3) EC number |  |  |
|    Initial value | Factory | At shipping |
|    Update | Field | At application of EC |
| (4) Shipping date | Factory | At shipping |
| (5) Customs clearance date | Field | At reception |
| (6) Customer name | Factory | At shipping |
| (7) Pointer to component record |  |  |
|    Initial value | Factory | At shipping |
|    Update | Field | At replacement |

2. Component Record

| | | |
|---|---|---|
| (1) Pointer to product record | | |
|    Initial value | Factory | At shipping |
|    Update | Field | At replacement |
| (2) Component code | Factory | At shipping |
| (3) Serial number | Factory | At shipping |
| (4) EC number | | |
|    Initial value | Factory | At shipping |
|    Update | Field | At application of EC |
| (5) Shipping date | Factory | At shipping |
| (6) Customs clearance date | Field | At reception |
| (7) Customer name | Field | At shipping |
| (8) Problem occurrence date 1 | Field | At occurrence |
| (9) Phenomenon 1 | Field | At occurrence |
| (10) Countermeasure 1 | Field | At occurrence |
| (11) Problem Occurrence date 2 | Field | At occurrence |
| (12) Phenomenon 2 | Field | At occurrence |
| (13) Countermeasurd 2 | Field | At occurrence |
| (14) Problem occurrence date 3 | Field | At occurrence |
| (15) Phenomenon 3 | Field | At occurrence |
| (16) Countermeasure 3 | Field | At occurrence |
| (17) Component replacement management item | | |
|    a. Problem occurrence date | Field | At occurrence |
|    b. Replaced date | Field | At replacement |
|    c. Serial number | | |
|       Initial value: blank | | |
|       Update | Field | At replacement |
| (18) Pointer to next component code | | |
|    Initial value | Factory | At shipping |
|    Update | Field | At replacement |

Among the above attributes of the record, the EC number is version information changed via an engineering change (EC) for a hardware modification and is updated in the field at the time at which an EC is applied.

Such a configuration management process enables automatic configuration management, including an update record, which has conventionally been impossible. Therefore, prevention of human errors and a reduction in work by an FE are enabled.

Figure 2:
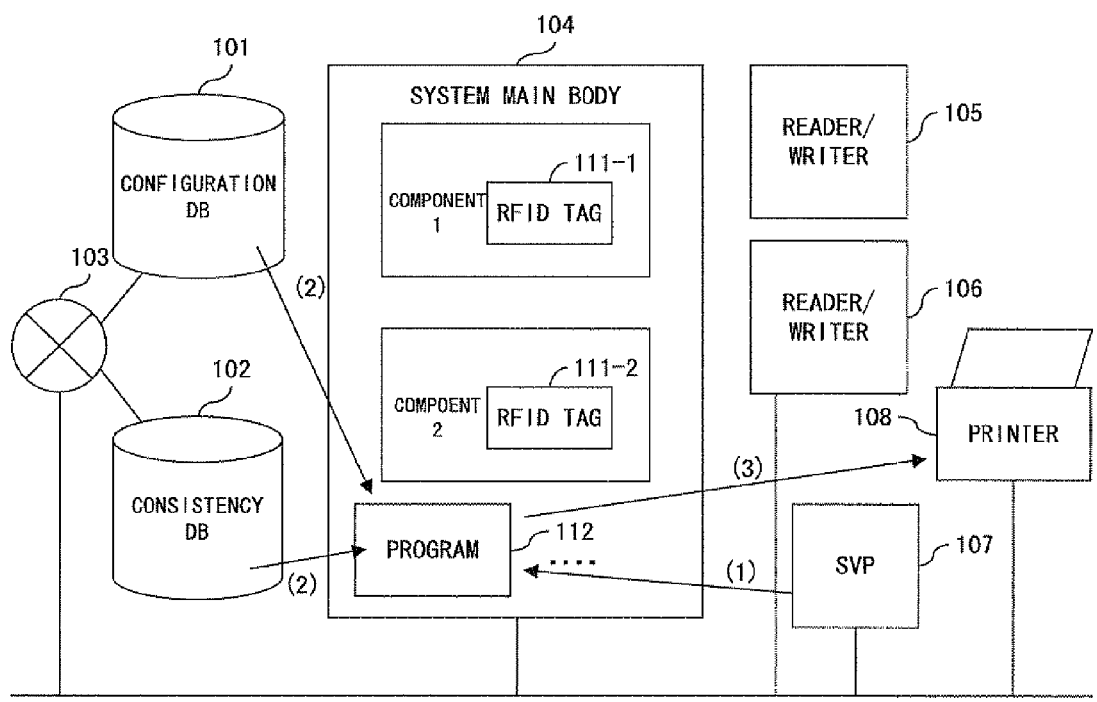
FIG. 2 is a diagram showing a consistency check process according to the present invention.

FIG. 2 shows a consistency check process in the system shown in FIG. 1. In the consistency check process, the configuration DB 101 and consistency DE 102 are matched with each other, and thereby the consistency between a pair of components including an EC level or the consistency as a system is checked. The consistency DB 102 is generated in advance of the processing, and stores information of another component that is required when using a certain component. The present embodiment is configured to store the following information.

The procedure for the consistency check process is as follows:

(1) The SVP 107 instructs a program 112 of the system main body 104 to perform a consistency check.

(2) The program 112 reads configuration DB 101 information and checks for matches with consistency DR 102 information.

It is assumed here that the configuration DB 101 and consistency DB 102 store component information in the following manner:

The configuration DR:
   Component 1=(CPU, EC number=V1)
   Component 2=(Printer, EC number=V2)

The consistency DB:
   Used component Required component(s)
   Component 1 Component 2, Component 3
   Component 2 Component 4

Component 1=(CPU, EC number=V2)
Component 2=(Printer, EC number=V2)
Component 3=(LAN card, EC number=V2)
Component 4=(GE cable, EC number=V4)

In this case, the EC number of component 1 in the configuration DR 101 is V1, while the EC number of component 1 in the consistency DB 102 is V2, and therefore there is inconsistency. Also, use of component 1 requires components 2 and 3, and use of component 2 requires component 4 in accordance with the consistency DB 102; neither components 3 nor 4, however, are registered in the configuration DB 101. The program 112 detects such inconsistency. Now, continuing the procedure:

(3) The program 112 instructs the printer 108 to print the result of the consistency check. If there is no inconsistency between the configuration DB 101 and consistency DB 102, "consistency is verified" is printed; if there is inconsistency, "problem in consistency" is printed.

Such consistency processing makes it possible to dynamically check the consistency, including EC levels, between components and between a component and a system.

FIG. 3 shows a process of automatically recording an error occurring in the system shown in FIG. 1. In this error occurrence recording process, the SVP 107 recognizes an error event occurring in a component and it writes the error information to the RFID tag of the component. The procedure of the error occurrence recording process is as follows:

(1) The SVP 107 issues a check signal to the system main body 104 and recognizes an error event occurring in component 2;

(2) The SVP 107 instructs the reader/writer 105 to record the error occurrence to the REID tag 111-2;

(3) The reader/writer 105 records the problem occurrence date and phenomenon to the RFID tag 111-2 in an addition mode. The RFID tag 111-2 and reader/writer 105 function normally even if component 2 has failed;

(4) A tally-up program 113 records the problem occurrence date & time in a component replacement management item of component 2 of the configuration DB 101; and (5) The SVP 107 records the replacement date & time and the serial number of the replacement component in the component replacement management item of component 2 of the configuration DR 101.

Such an error occurrence recording process records an error history in an REFID tag and therefore improves the possibility of identifying a failure point of a repair component more quickly by enabling a component in which the number of error occurrences is large to be investigated first. It is empirically known that a component in which a plurality of errors has occurred is likely failing continuously. This process also enables the ascertainment of whether or not a component has been replaced without visiting a customer's site by referring to a component replacement management item of the configuration DB 101.

Figure 4:
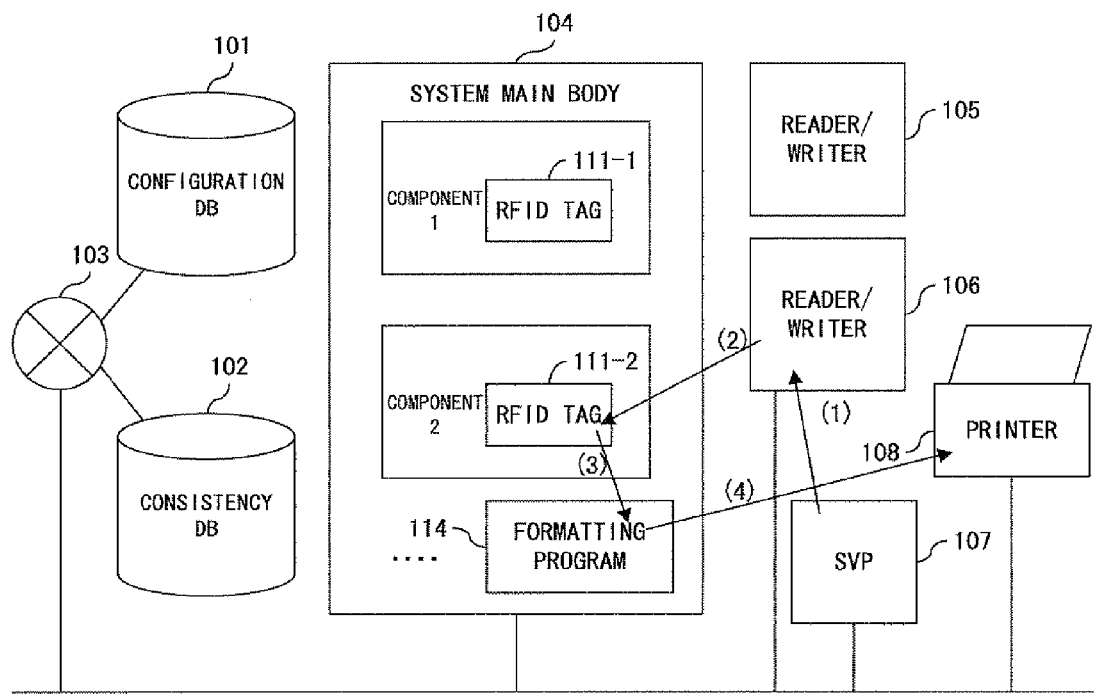
FIG. 4 is a diagram showing a component code verification process according to the present invention.

FIG. 4 shows a component code verification process in the system shown in FIG. 1. The component code verification process records a component code of a component in the RFID tag, thereby making it possible to identify a component code even if a component code is not printed on the component. This avoids a difference in actual components. A failed component is returned to a support center for repair. When a component is hot swapped or the power to the system main body 104 is turned on, the component code verification process is carried out in the following procedure:

(1) The SVC 107 instructs the reader/writer 106 to start a print process for a transmittal letter (a parts repair tag) in order to request a repair of component 2;

(2) The reader/writer 106 reads information of the REID tag 111-2;

(3) A formatting program 114 generates a transmittal letter based on the readout information; and (4) The formatting program 114 instructs the printer 108 to print the transmittal letter.

Such a component code verification process makes it possible to print a transmittal letter of a repair component automatically, thus preventing a difference in actual components.

Figure 5:
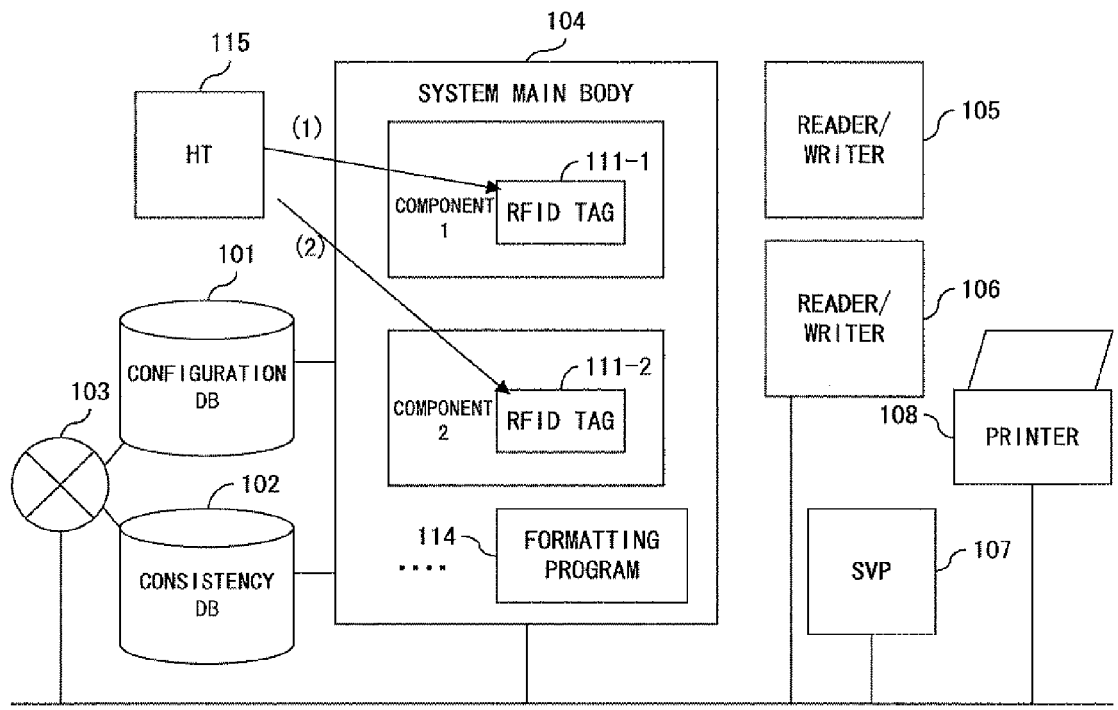
FIG. 5 is a diagram showing a failed component detection process according to the present invention.

FIG. 5 shows a failed component detection process in the system shown in FIG. 1. A component code and message are recorded in an REID tag, enabling an FE to discover a failure spot (i.e., a failed component) of the system main body 104 simply by operating a handheld terminal (HT) 115. The HT 115 is a portable information processing apparatus with a built-in reader/writer. In this case, it is not necessary to turn on the power to the system main body 104. The procedure of the failed component detection process is as follows:

(1) Holding the HT 115, the FE approaches the front of component 1. An error occurrence at the current time is not recorded in the RFID tag 111-1 of component 1, and therefore the HT 115 does not display an error;

(2) The FE then approaches the front of component 2, holding the HT 115. An error occurrence is recorded in the RFID 111-2 of component 2, and therefore the HT 115 displays an error, enabling the FE to identify a failed component; and (3) The FE is also enabled to ascertain error history on the basis of the configuration DB 101 and the RFID tag 111-2 of component 2, and the FE is accordingly able to provide more adequate countermeasures. Conceivable countermeasures include, for example, the preventive replacement of component 2 if the same problem has occurred three times, or setting up monitoring for the time being by turning the power to the system main body 104 off/on if a specific problem has occurred just one time.

Such a failed component detection process enables an FE to ascertain which component has failed without turning on the power to the system main body 104 and to accordingly begin component replacement work immediately. The FE is also enabled to ascertain error history in the configuration DB 101 and the REFID tag of the failed component and therefore to carry out maintenance work more effectively.

Figure 6:
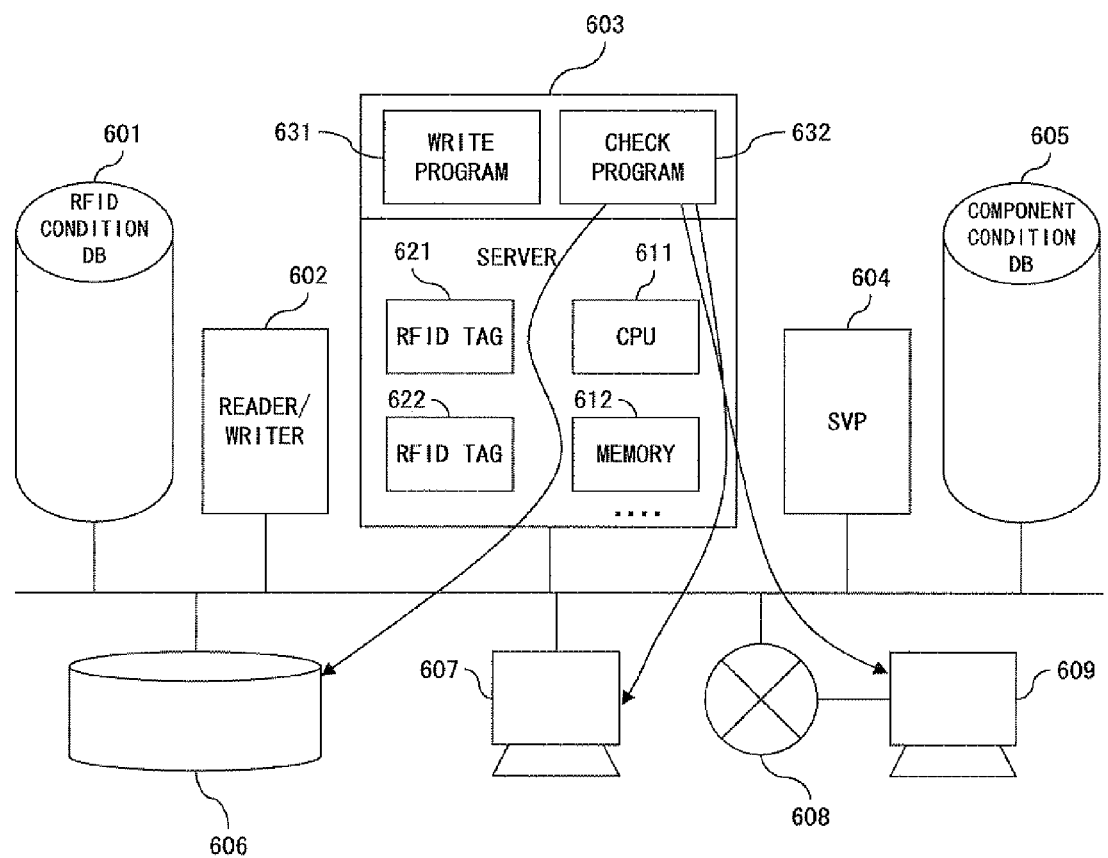
FIG. 6 is a diagram showing an information processing system.
Figure 8:
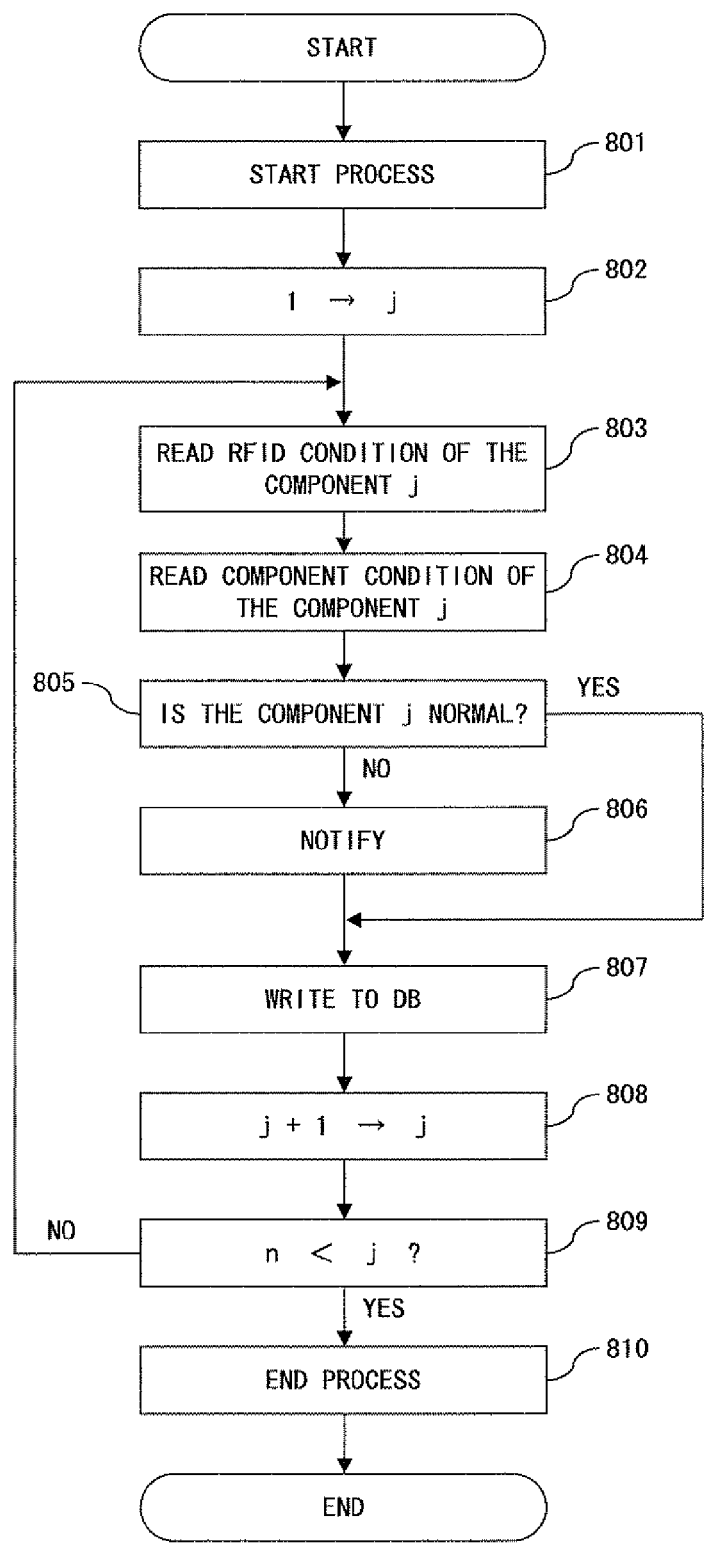
FIG. 8 is a flow chart of an error occurrence recording process.

Next is a description of another example of the above described error occurrence recording process, referring to FIGS. 6 through 8.

FIG. 6 shows an information processing system performing an error occurrence recording process. The system shown in FIG. 6 comprises an RFID condition DB 601, a reader/writer 602, a server 603, an SVP 604, a component condition DB 605, a log DB 606, display devices 607 and 609, and a communications network 608.

The server 603, being a system that is a management target, comprises an "n" number of components, including a central processing unit (CPU) 611 and a memory 612. The CPU 611 and memory 612 respectively have REID tags 621 and 622 attached. A write program 631 and a check program 632 are incorporated into the server 603.

The SVP 604 checks the operating condition of each component of the server 603 at a certain time interval so that the write program 631 stores the information in the component condition DB 605. The reader/writer 602 obtains the condition of each component from the attached RFID tag at a certain time interval so that the write program 631 stores the information in the REFID condition DB 601. Then, the check program 632 compares the current condition of each component with an immediately previous condition thereof and reports warning information if the two conditions are different from each other.

The RFID condition DB 601 and component condition DS 605 store a product record 701 and a component record **702-*i* of each component i (where i=1, 2 ... through n) as shown in FIG. 7. Components 1 and 2 correspond to the CPU 611 and memory 612, respectively. The component record 702-*i* that is linked from the product record 701** includes at tributes as follows:

1. Component record of an RFID condition DE a. Component code b. Serial number c. Immediately previous information A1
      c1: Checked date and time
      c2: Condition flag (true or false)

d. Current information A2
      d1: Checked date and time
      d2: Condition flag (true or false)

2. Component record of a component condition DB a. Component code b. Serial number c. Immediately previous information B1
      c1: Checked date and time
      c2: Condition flag (true or false)

d. Current information B2
      d1: Checked date and time
      d2: Condition flag (true or false)

Meanwhile, component records of the RFID tags 621 and 622 possess attributes as follows:

a: Component code b: Serial number

FIG. 8 is a flow chart of an error occurrence recording process in the system shown by FIG. 6. The server 603 secures the work area within the memory 612 as follows, thereby carrying out the process:

(1) RFID area j: an area for importing a component record of a component j stored in the RFID condition DB (2) Component area j: an area for importing a component record of a component j stored in the component condition DB (3) TF area: an area for setting "true" or "false"

First, the server 603 starts up the write program 631 periodically. The startup cycle is variable so that the cycle is shortened if a problem occurs frequently. The write program 631 opens the RFID condition DB 601 and component condition DB 605 (step 801) and sets control variable j to "1" (step 802).

The write program 631 then sets the component record content of a component j stored in the RFID condition DB 601 to an RFID area j (step 803), then copies the current information A2 of the RFID area j to the immediately previous information A1 of the RFID area j and sets "true" in the TF area.

The reader/writer 602 reads the content of the component record from the RFID tag of the component j and hands the content over to the write program 631. The write program 631 in turn compares the serial number of the RFID area j with that of the RFID tag and sets "false" in the TF area if the two are not identical. Also, the write program 631 sets "false" in the TF area if the reader/writer 602 cannot read the serial number from the RFID tag of the component j. In addition, it sets the content of the TF area in the condition flag of the current information A2 of the RFID area j.

Then, the write program 631 sets, in a component area j, a component record content of the component j stored in the component condition DB 605 (step 804), then copies the current information B2 of a component area j to the immediately previous information BP of the component j and sets "true" in the TF area.

The SVP 604 issues a check signal to a component j. If the component j has failed or does not exist, a response signal does not come back from the component j and the SVP 604 accordingly notifies the write program 631 of an error occurrence. Having received it, the write program 631 sets "false" in the TF area and sets the content of the TF area in the condition flag of the current information B2 of the component area j.

Then, the check program 632 is called up to check condition flags of the A1 and A2 of the RFID area j and those of the E1 and B2 of the component area j, and to return the check result back to the write program 631 (step 805).

If all of these flags are "true", the component j is judged to be normal. In this case, the write program 631 writes the content of the REID area j to the component record of the component j stored in the component condition DB 605 (step 807). Additionally, it increments j by "1" (step 808), compares j with the number of components n (step 809) and repeats the processes in step 803 and thereafter if the value of j is equal to or smaller than that of n.

In contrast, if the condition flags of A2 and/or B2 are false, an error is judged to have occurred to the component j. In this case, the check program 632 carries out a notification process in accordance with values of the condition flags of A2 and B2 (step 806) as follows:

(1) When A1=true, A2=false, B1=true, and B2=true

An event of a component j being replaced or an RFID tag not being attached to the component j is reported When a component is replaced, the serial numbers will not be identical in step 803 and therefore "false" will be set in A2 of the RFID area j.

(2) When A1=true, A2=true, B1=true, and B2=false

An event of a component j being failed is reported. When the component j is in failure, a response signal is not returned in step 804 and therefore "false" is set in B2 of the component area j.

(3) When A1=true, A2=false, B1=true, and B2=false

It is reported that component j does not exist. When component j does not exist, no serial number can be read in step 803 and therefore "false" is set in A2 of the REFID area j. Also, a response signal is not returned in step 804 and therefore "false" is set in B2 of the component area j.

The check program 632 notifies a notification recipient of error information as described in paragraphs (1) through (3) above using any of the following methods, for example:

(a) A message log is stored in the log DB 606.

(b) Error information is displayed on the screen of the display device 607 of the SVP 604.

(c) Remote reporting is carried out to the display device 609 installed in the support center or the like by way of the communications network 608.

Then, the write program 631 carries out the processes of step 807, and thereafter, the process proceeds as in the case of the component j being normal. Then, when the value of D exceeds that of n in step 909, it closes the RFID condition DB 601 and component condition DB 605 (step 810) and ends the process.

Such an error occurrence recording process obtains component conditions by both the SVP 604 and reader/writer 602, and these pieces of information are recorded in databases. Furthermore, comparing two conditions, for which the methods of obtainment are different, of individual components makes it possible to detect an abnormality effectively. Additionally, remote reporting of an error makes it possible to identify a failure spot even if no FE visits the customer's site.

Note that the error occurrence recording process shown in FIG. 8 can be implemented by combining, with a part or the entirety of the processes described above (i.e., the configuration management process shown in FIG. 1, the consistency check process shown in FIG. 2, the error occurrence recording process shown in FIG. 3, the component code verification process shown in FIG. 4, and the failed component detection process shown in FIG. 5).

The above described embodiments primarily exemplify the carrying out of system support for an information processing system; the present invention, however, is applicable to system support for a discretionary hardware system, including a communication system or the like. Also, in lieu of executing various programs in the system as a management target, these programs can be executed within the SVP.

Figure 9:
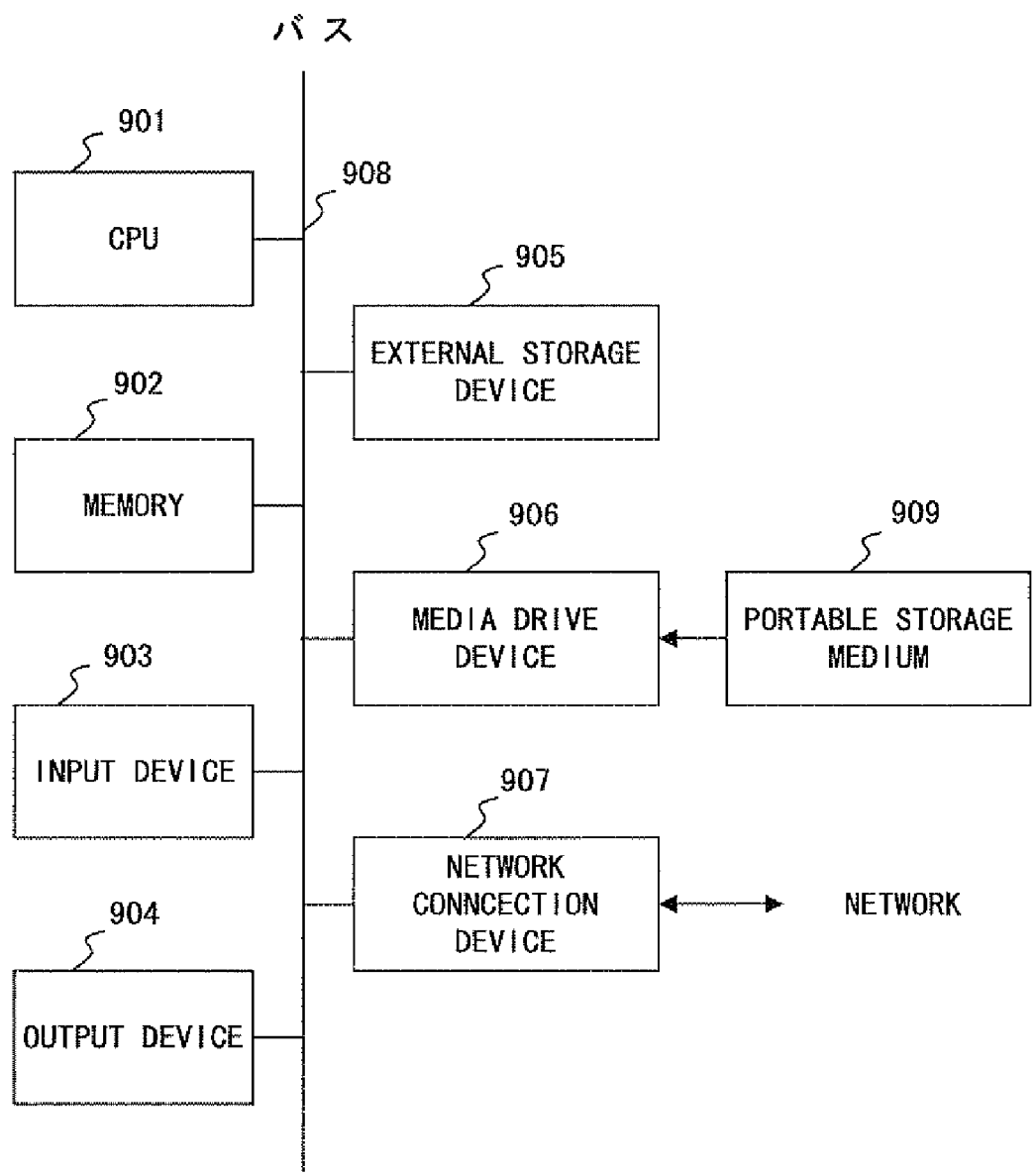
FIG. 9 is a configuration diagram of an information processing apparatus.

Incidentally, the system main body 104 and SVP 107 shown in FIG. 1 and the server 603 and SVP 604 shown in FIG. 6 are configured by using an information processing apparatus (i.e., a computer), as shown in FIG. 9, for example. The information processing apparatus shown in FIG. 9 comprises a CPU 901, memory 902, an input device 903, an output device 904, an external storage device 905, a media drive device 906 and a network connection device 907, with a bus 908 interconnecting these constituent components.

The memory 902 includes, for example, read only memory (ROM), random access memory (RAM) and the like, and stores a program and data used for processing. The CPU 901 executes the program by utilizing memory 902, thereby performing necessary processing.

The input device 903 can be used for, for example, inputting an operator instruction and information. The output device 904, being a display, a printer, a speaker or the like, is used for outputting an inquiry to an operator, a processing result or the like. The display device 607 shown in FIG. 6 corresponds to the output device 904.

The external storage device 905 can be, for example, a magnetic disk device, an optical disk device, a magneto-optical device, a tape device or the like. The information processing apparatus stores a program and data in the external storage device 905 and uses them by loading them into the memory 902 on an as-required basis.

The external storage device 905 is also used as the configuration DB 101 and consistency DB 102 that are shown in FIG. 1, and as the RFID condition DB 601, component condition DB 605 and log DB 606 that are shown in FIG. 6. In such a case, the configuration DB 101 and consistency DB 102 may be stored in the same external storage device 905. Likewise, the RFID condition DB 601 and component condition DB 605 may be stored in the same external storage device 905.

The media drive device 906 drives a portable storage medium 909 and accesses its record content. The portable storage medium 909 is a discretionary computer readable recording medium such as a memory card, flexible disk, optical disk, magneto-optical disk or the like. An operator stores the program and data in the portable storage medium 909 and uses them by loading them onto the memory 902 on an as-required basis.

The network connection device 907 is connected to a communications network such as a local area network (LAN) or the like, and carries out a data conversion in association with a communication. The information processing apparatus receives the program and data on an as-required basis from an external device by way of the network connection device 907, and uses them by loading them onto the memory 902.

Figure 10:
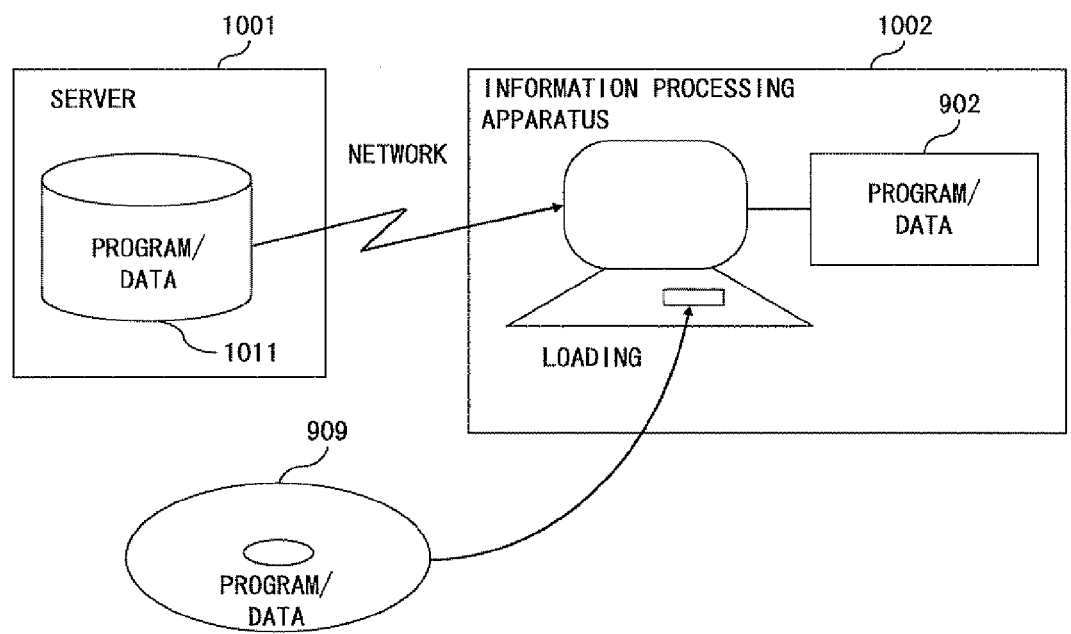
FIG. 10 is a diagram showing a method for providing a program and data.

FIG. 10 shows a method for providing the information processing apparatus shown in FIG. 9 with a program and data. The program and data stored in a portable storage medium 909 or a database 1011 of the server 1001 is loaded onto the memory 902 of the information processing apparatus 1002. The server 1001 generates a carrier signal for carrying the program and data, and transmits it to the information processing apparatus 1002 by way of an arbitrary transmission medium on a communications network. The CPU 901 executes the program by using the data, thereby performing necessary processing.

What is claimed is:

1. A management apparatus for managing a configuration of a system constituted by a plurality of components each of which has a radio frequency identification tag attached, comprising:
   a check unit for checking an operating condition of each component at a predetermined opportune time by issuing a check signal to each component and verifying whether each component is in operation based on a response signal from each component;
   a tag reader for reading component information of each component recorded in the radio frequency identification tag at the predetermined opportune time, the component information being different from the response signal from each component; and
   a storage unit for storing a check result of the operating condition and the component information for each component.

2. A computer-readable storage medium in which a program for a computer for managing a configuration of a system that is constituted by a plurality of components, each of which has a radio frequency identification tag attached, and comprises a tag reader, is recorded, wherein the program makes the computer perform
   checking an operating condition of each component at a predetermined opportune time by issuing a check signal to each component and verifying whether each component is in operation based on a response signal from each component;
   controlling the tag reader to read component information of each component recorded in the radio frequency identification tag at the predetermined opportune time, the component information being different from the response signal from each component; and
   storing a check result of the operating condition and the component information for each component.

3. A computer-readable storage medium in which a program for a computer for managing a configuration of a system that is constituted by a plurality of components, each of which has a radio frequency identification tag attached, and comprises a tag reader, is recorded, wherein the program makes the computer perform
   checking an operating condition of each component at a predetermined opportune time,
   controlling the tag reader to read component information of each component recorded in the radio frequency identification tag at the predetermined opportune time,
   storing a check result of the operating condition and the component information for each component,
   storing operation abnormality information as the check result of the operating condition in said storage unit if an operation of a component cannot be verified,
   comparing immediately previous component information stored in the storage unit with current component information read out of said radio frequency identification tag, and
   storing component abnormality information in the storage unit if the immediately previous component information and the current component information are not identical.

4. The storage medium according to claim 3, wherein the program makes said computer report a component failure if an operation of a component cannot be verified and if the immediately previous component information and the current component information are identical.

5. The storage medium according to claim 3, wherein the program makes said computer report a component replacement if an operation of a component is verified and if the immediately previous component information and the current component information are not identical.

6. The storage medium according to claim 3, wherein the program makes said computer report a fact of a component not existing if an operation of a component cannot be verified and if the immediately previous component information and the current component information are not identical.

7. A computer-readable storage medium in which a program for a computer for managing a configuration of a system that is constituted by a plurality of components, each of which has a radio frequency identification tag attached, and comprises a tag reader, is recorded, wherein the program makes the computer perform
   checking an operating condition of each component at a predetermined opportune time,
   controlling the tag reader to read component information of each component recorded in the radio frequency identification tag at the predetermined opportune time,
   storing a check result of the operating condition and the component information for each component,
   if a first component is included in said system, comparing component information of a second component required for the first component, that is stored in a consistency database, with component information stored in said storage unit,
   checking whether or not the second component is included in the system, and
   outputting a check result.

8. The storage medium according to claim 2, wherein:
   said system comprises a tag writer; and
   the program makes said computer control the tag writer to write error information to a radio frequency identification tag attached to a component if an operation of the component cannot be verified.

9. A computer-readable storage medium in which a program for a computer for managing a configuration of a system that is constituted by a plurality of components, each of which has a radio frequency identification tag attached, and comprises a tag reader, is recorded, wherein the program makes the computer perform
   checking an operating condition of each component at a predetermined opportune time, and
   controlling the tag reader to read component information of each component recorded in the radio frequency identification tag at the predetermined opportune time, and
   storing a check result of the operating condition and the component information for each component, and
   wherein the program makes said computer print a transmittal letter for repair of a component based on component information read out of said radio frequency identification tag if an operation of the component cannot be verified.

10. A management method for managing a configuration of a system that is constituted by a plurality of components, each of which has a radio frequency identification tag attached, and comprises a tag reader, said management method comprising:
- checking an operating condition of each component at a predetermined opportune time by issuing a check signal to each component and verifying whether each component is in operation based on a response signal from each component;
- controlling the tag reader to read component information of each component recorded in the radio frequency identification tag at the predetermined opportune time, the component information being different from the response signal from each component; and
- storing a check result of the operating condition and the component information for each component in a storage unit.

11. A method, comprising:
- checking an operating status of each component in a plurality of components by issuing a check signal to a radio frequency identification tag attached to each of the plurality of components at a particular time and receiving a response;
- reading component information from the radio frequency identification tag attached to each component in the plurality of components at the particular time, the component information different from the response; and
- storing the operating status and the component information of each of the plurality of components.

* * * * *